(12) United States Patent  
Anzawa et al.

(10) Patent No.: US 12,494,992 B2
(45) Date of Patent: *Dec. 9, 2025

(54) MANAGEMENT APPARATUS

(71) Applicant: NTT DOCOMO, INC., Chiyoda-ku (JP)

(72) Inventors: Masashi Anzawa, Chiyoda-ku (JP); Hiroki Ishizuka, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 158 days.

This patent is subject to a terminal disclaimer.

(21) Appl. No.: 18/249,284

(22) PCT Filed: Nov. 5, 2021

(86) PCT No.: PCT/JP2021/040766
§ 371 (c)(1),
(2) Date: Apr. 17, 2023

(87) PCT Pub. No.: WO2022/113698
PCT Pub. Date: Jun. 2, 2022

(65) Prior Publication Data
US 2023/0396534 A1 Dec. 7, 2023

(30) Foreign Application Priority Data
Nov. 25, 2020 (JP) ................. 2020-194986

(51) Int. Cl.
G06F 30/20 (2020.01)
H04L 1/20 (2006.01)
(Continued)

(52) U.S. Cl.
CPC ............ H04L 45/302 (2013.01); G06F 30/20 (2020.01)

(58) Field of Classification Search
CPC ......... H04L 9/50; H04L 9/0637; H04L 45/02; H04L 45/14; H04L 47/20; G06F 21/602
See application file for complete search history.

(56) References Cited

U.S. PATENT DOCUMENTS 6,510,219 B1 *  1/2003 Wellard ................ H04M 7/006
                                                  379/900
2018/0254982 A1 *  9/2018 Apostolopoulos .... H04L 45/302
(Continued)

FOREIGN PATENT DOCUMENTS

CN   110690999 A   1/2020
JP   2019-213161 A  12/2019

OTHER PUBLICATIONS

International Search Report issued Jan. 18, 2022 in PCT/JP2021/040766 filed Nov. 5, 2021 (with English Translation), 4 pages.
(Continued)

Primary Examiner — Nicholas R Taylor
Assistant Examiner — Ho T Shiu
(74) Attorney, Agent, or Firm — Oblon, McClelland, Maier & Neustadt, L.L.P.

(57) ABSTRACT

A management apparatus includes: a provider configured to, in response to receiving a first request from a first node, provide the first node with first information corresponding to the first request, the first request being a request to control quality of communication within a group constituted by the first node and a plurality of second nodes, the first node and each of the plurality of second nodes each having a blockchain, the communication being communication for appending additional data to the blockchain, and the first node and the plurality of second nodes being configured to execute the communication; and a quality controller configured to set quality of communication in a first communication path to quality that is better than or equal to a first quality in response to receiving the first information in addition to a (Continued)

second request from a receiving node among the plurality of second nodes, the receiving node having received the first information during forwarding of the first information within the group, and the second request being a request to control the quality of the communication in the first communication path, in which the first communication path includes a first end and a second end, the first end is the receiving node, and the second end is a first connection node different from a node having forwarded the first information to the receiving node, the first connection node being a node among the nodes belonging to the group, and the first connection node being connected to the receiving node not via any of the nodes belonging to the group.

10 Claims, 8 Drawing Sheets

(51) Int. Cl.
  *H04L 12/66* (2006.01)
  *H04L 45/302* (2022.01)

(56) References Cited

U.S. PATENT DOCUMENTS

2020/0167512 A1\* 5/2020 Chitra ................... G06Q 50/06
2023/0370388 A1 11/2023 Anzawa et al.

OTHER PUBLICATIONS

U.S. Office Action dated Jan. 28, 2025, issued in U.S. Appl. No. 18/246,436.
International Search Report dated Jan. 25, 2022, issued in International Application No. PCT/JP2021/040765.

\* cited by examiner

FIG. 6

| ONE-TIME PASS | TARGET COMMUNICATION PATH | PROCESSING |
|---|---|---|
| P1 | COMMUNICATION PATH K2a (NODE 20 ⇔ NODE 30) | EXECUTED |
| P1 | COMMUNICATION PATH K2b (NODE 20 ⇔ NODE 40) | EXECUTED |
| P1 | COMMUNICATION PATH K1a (NODE 40 ⇔ NODE 50) | UNEXECUTED |
| P1 | COMMUNICATION PATH K1b (NODE 40 ⇔ NODE 60) | UNEXECUTED |

MANAGEMENT APPARATUS

TECHNICAL FIELD

The present invention relates to a management apparatus.

BACKGROUND ART

A system is known that uses a blockchain (see Patent Document 1, for example). The blockchain is a database of data such as transaction data. The blockchain includes blocks connected to each other in series. Each of the blocks includes data such as transaction data. The blockchain is used by a plurality of nodes. In response to one of the plurality of nodes generating additional data (for example, transaction data or a block) to be appended to the blockchain, the additional data is forwarded within the plurality of nodes to be appended to the blockchain.

RELATED ART DOCUMENT

Patent Document

Patent Document 1: Japanese Patent Application Laid-Open Publication No. 2019-213161

SUMMARY OF THE INVENTION

Problem to be Solved by the Invention

If it takes time to forward additional data, the timing of appending the additional data to a blockchain will be delayed. Accordingly, a technique for assisting a node to reduce latency in the timing of appending additional data to a blockchain is desirable.

An object of the present invention is to provide a technique for assisting a node to reduce latency in the timing of appending data to a blockchain.

Means for Solving Problem

A management apparatus according to one aspect of the present invention includes: a provider configured to, in response to receiving a first request from a first node, provide the first node with first information corresponding to the first request, the first request being a request to control quality of communication within a group constituted by the first node and a plurality of second nodes, the first node and each of the plurality of second nodes each having a blockchain, the communication being communication for appending additional data to the blockchain, and the first node and the plurality of second nodes being configured to execute the communication; and a quality controller configured to set quality of communication in a first communication path to quality that is better than or equal to a first quality in response to receiving the first information in addition to a second request from a receiving node among the plurality of second nodes, the receiving node having received the first information during forwarding of the first information within the group, and the second request being a request to control the quality of the communication in the first communication path, in which the first communication path includes a first end and a second end, the first end is the receiving node, and the second end is a first connection node different from a node having forwarded the first information to the receiving node, the first connection node being a node among the nodes belonging to the group, and the first connection node being connected to the receiving node not via any of the nodes belonging to the group.

Effects of Invention

According to one aspect of the present invention, it is possible to assist a node to reduce latency in the timing of appending data to a blockchain.

BRIEF DESCRIPTION OF THE DRAWINGS

FIG. 6 is a diagram showing an example of a management table 122.

MODES FOR CARRYING OUT THE INVENTION

A: First Embodiment

A1: Network System 1

Figure 1:
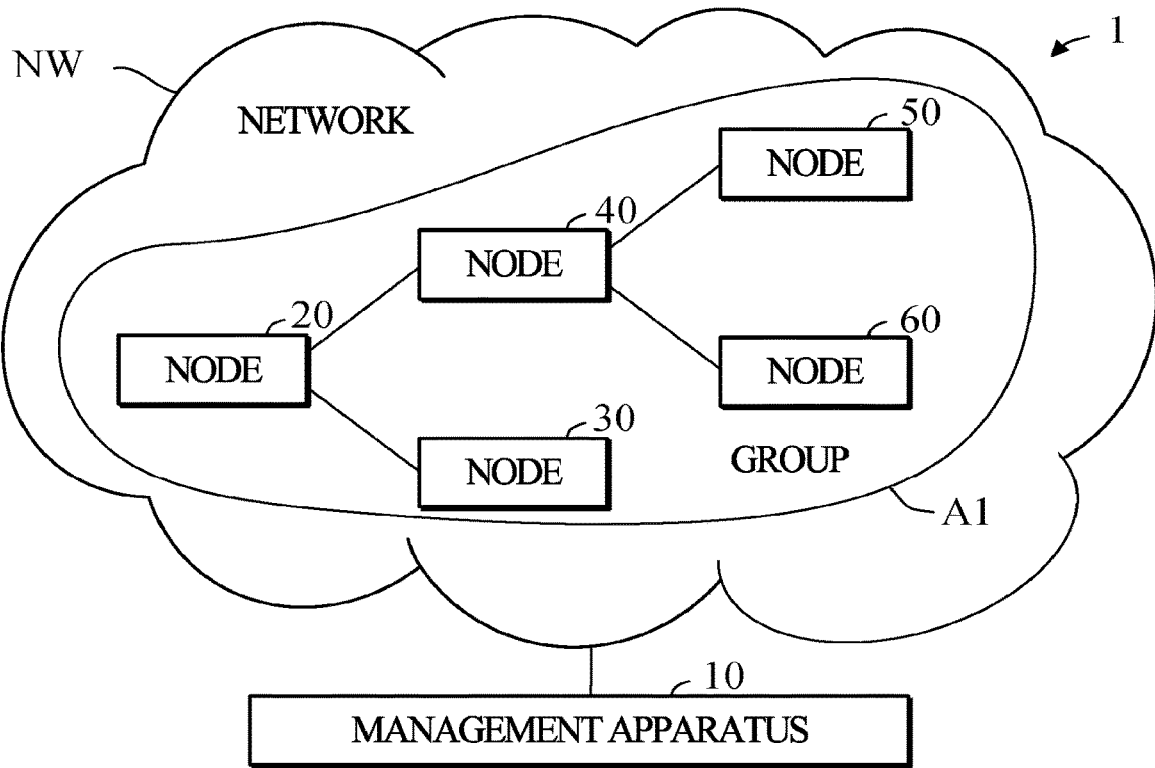
FIG. 1 is a diagram showing a network system 1.

FIG. 1 is a diagram showing a network system 1. The network system 1 includes a network NW and a management apparatus 10. The network NW includes a group A1 of nodes 20, 30, 40, 50, and 60. The network NW further includes nodes that do not belong to the group A1.

The node 20 is an example of a first node. The nodes 30, 40, 50, and 60 are examples of a plurality of second nodes. Each of the nodes 30, 40, 50, and 60 is an example of a second node. The number of second nodes is not limited to four as long as the number of second nodes is two or more. The group A1 is an example of a group constituted by the first node and the plurality of second nodes.

The nodes 20, 30, 40, 50, and 60 constitute a peer to peer (P2P) network. A configuration of the P2P network is not limited to the configuration shown in FIG. 1 and may be modified as appropriate.

Each of the nodes 20, 30, 40, 50, and 60 includes a common blockchain BC. In other words, the nodes 20, 30, 40, 50 and 60 each have the blockchain BC.

Figure 2:
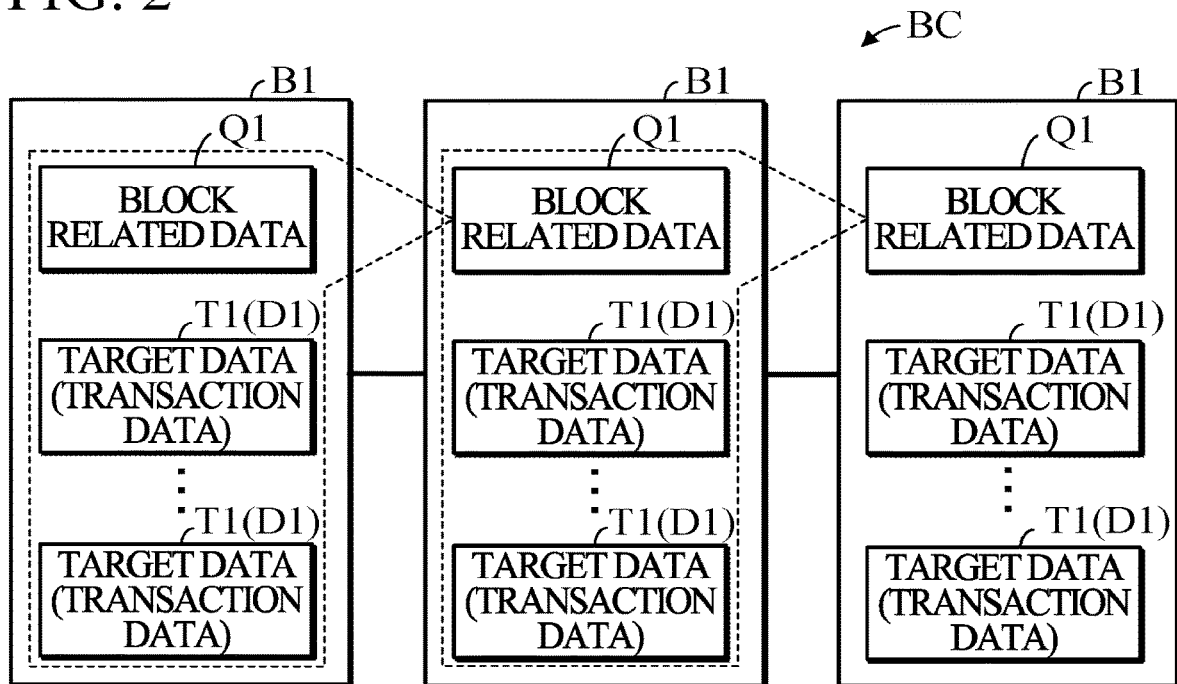
FIG. 2 is a diagram showing an example of a blockchain BC.

FIG. 2 is a diagram showing an example of the blockchain BC. The blockchain BC includes blocks B1 connected to each other in series. Each of the blocks B1 includes block-related data Q1 and target data T1.

The block-related data Q1 is based on data included in a previous block B1. For example, the block-related data Q1 indicates a hash value based on the data included in the previous block B1. The block-related data Q1 contributes to resistance against falsification of data in the blockchain BC.

The target data T1 is transaction data D1, for example. The transaction data D1 is data on transactions of crypto-currency, for example. The crypto-currency may be referred to as "virtual currency" or "electronic currency." The transaction data D1 is not limited to the data on transactions of crypto-currency. For example, the transaction data D1 may be data on transactions of real estate, data on transactions of movable property, or data on transactions of information. The transaction data D1 may be referred to as a "transaction." The target data T1 is not limited to the transaction data D1 and may be data on exchanges of information on a contract, etc., for example. The blockchain BC is an example of a database that manages the target data T1.

In the following, to facilitate explanation, an example in which the target data T1 is the transaction data D1 will be described. The transaction data D1 may be generated by any one of the plurality of nodes 20, 30, 40, 50, and 60.

The transaction data D1 is forwarded from a node, which is a generator of the transaction data D1, to nodes, which are other than the generator of the transaction data D1, among the plurality of nodes 20, 30, 40, 50, and 60. In response to receiving the transaction data D1, each of the plurality of nodes 20, 30, 40, 50, and 60 inspects the transaction data D1.

The block B1 is generated by a node, which is referred to as a "miner node," among the plurality of nodes 20, 30, 40, 50, and 60. The miner node combines a plurality of pieces of transaction data D1 into a block B1.

The block B1 is forwarded from the miner node, which is a generator of the block B1, to nodes, which are other than the generator of the block B1, among the plurality of nodes 20, 30, 40, 50, and 60. In response to receiving the block B1, each of the plurality of nodes 20, 30, 40, 50, and 60 inspects the block B1.

In response to a result of the inspection of the block B1 being valid, each of the plurality of nodes 20, 30, 40, 50, and 60 appends the block B1 to the existing blockchain BC. Appending the block B1 to the existing blockchain BC means connecting the block B1 to the existing blockchain BC. The block B1, the target data T1, and the transaction data D1 are each an example of predetermined data. The predetermined data is an example of additional data.

Each of the nodes 20, 30, 40, 50, and 60 executes communication for appending the transaction data D1 to the blockchain BC. In the following, "communication for appending the transaction data D1 to the blockchain BC" may be referred to as "data appending communication". An example of the data appending communication is communication of the transaction data D1. Another example of the data appending communication is communication of the block B1 that includes the transaction data D1. In the network NW, the block B1 and data such as transaction data D1 are communicated by packet.

The earlier the timing of appending the transaction data D1 to the blockchain BC is, the earlier the timing at which it may be assumed that the transaction data D1 will be finalized is. The management apparatus 10 controls quality of the data appending communication to reduce latency in the timing of appending the transaction data D1 to the blockchain BC. By reducing latency in the timing of appending the transaction data D1 to the blockchain BC, the management apparatus 10 accelerates the timing at which it may be assumed that the transaction data D1 will be finalized. By accelerating the timing at which it may be assumed that the transaction data D1 will be finalized, the management apparatus 10 assists at least one of the nodes 20, 30, 40, 50, and 60.

Figure 3:
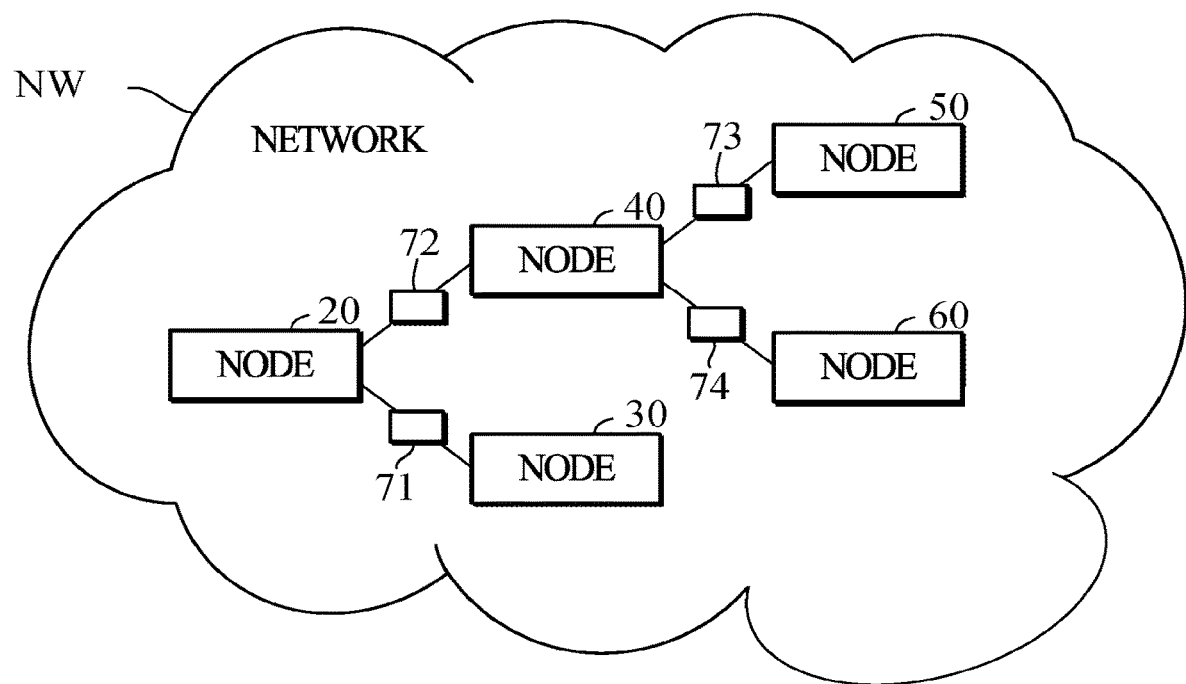
FIG. 3 is a diagram showing an example of a network NW.

FIG. 3 is a diagram showing an example of the network NW. The network NW includes communication apparatuses 71, 72, 73, and 74 in addition to the nodes 20, 30, 40, 50, and 60. Each of the communication apparatuses 71, 72, 73, and 74 is a router, for example. The nodes 20, 30, 40, 50, and 60, and the communication apparatuses 71, 72, 73, and 74 are able to communicate with the management apparatus 10.

The management apparatus 10 controls quality of communication in the network NW by causing at least one of the communication apparatuses 71, 72, 73, and 74 to execute priority control, bandwidth control, or a combination thereof.

The priority control is, for example, control to preferentially transfer packets related to a specific communication. While the priority control is executed, low latency, improvement of throughput, high speed, high reliability, etc., are realized in the specific communication. The bandwidth control is control to adjust a bandwidth used for communication. When the bandwidth of the communication is expanded by the bandwidth control, low latency, improvement of throughput, high speed, high reliability, etc., are realized in the communication, for example. The priority control and the bandwidth control are examples of Quality of Service (QoS) control.

The management apparatus 10 causes at least one of the communication apparatuses 71, 72, 73, and 74 to execute the QoS control, thereby reducing latency in the timing of appending the transaction data D1 to the blockchain BC.

A2: Node 20

The node 20 is a personal computer. The node 20 is not limited to a personal computer and may be a smartphone or a tablet, for example. The node 20, together with each of the nodes 30 and 40, executes the data appending communication (communication for appending the transaction data D1 to the blockchain BC).

Figure 4:
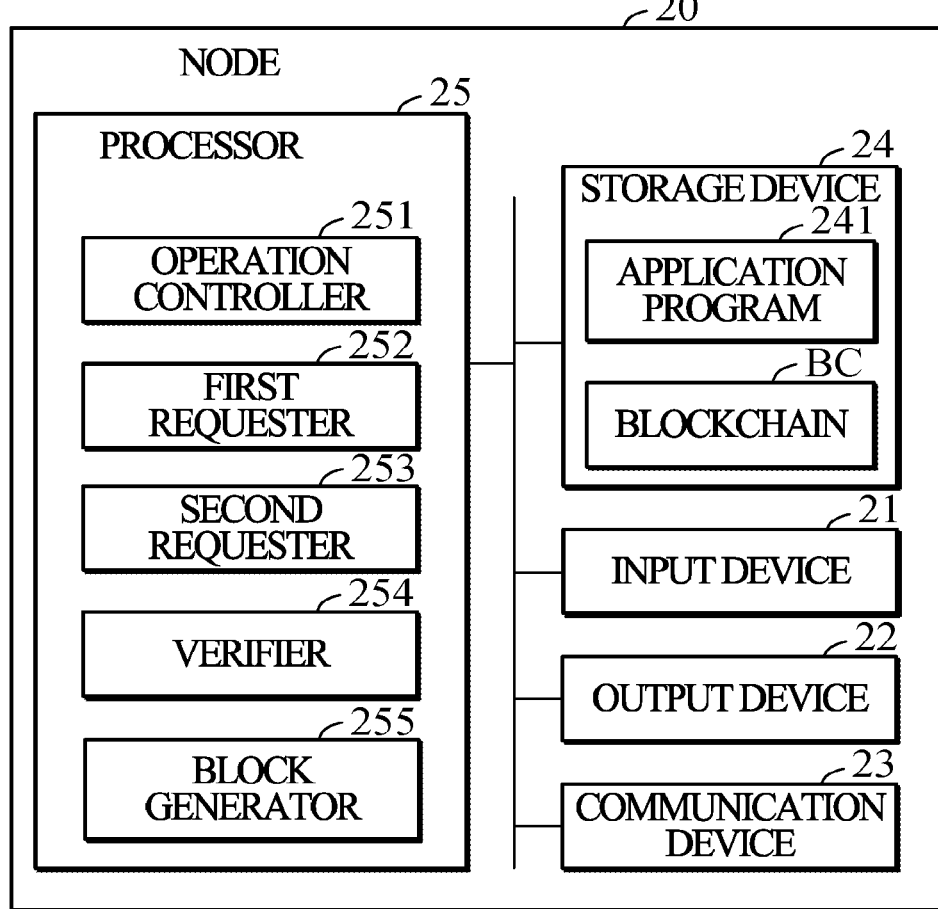
FIG. 4 is a diagram showing an example of a node 20.

FIG. 4 is a diagram showing an example of the node 20. The node 20 includes an input device 21, an output device 22, a communication device 23, a storage device 24, and a processor 25.

The input device 21 includes a keyboard. The input device 21 may include a mouse, a touch panel, or a combination thereof. When the input device 21 includes a touch panel, the input device 21 may not include the keyboard, the mouse, or a combination thereof. The input device 21 accepts operations performed by a user.

The output device 22 includes a display. The output device 22 may include a touch panel. The output device 22 displays various information. When the output device 22 includes a touch panel, the output device 22 may not include the display. The touch panel may be used as the input device 21 and the output device 22.

The communication device 23 communicates with the node 30 via the communication apparatus 71 such as a router. The communication device 23 communicates with the node 40 via the communication apparatus 72 such as a router. The communication device 23 further communicates with the management apparatus 10.

The storage device 24 is a recording medium readable by the processor 25. The storage device 24 includes, for example, a nonvolatile memory and a volatile memory. The nonvolatile memory is, for example, a read only memory (ROM), an erasable programmable read only memory (EPROM), and an electrically erasable programmable read only memory (EEPROM). The volatile memory is, for example, a random access memory (RAM). The storage device 24 stores an application program 241 and the blockchain BC.

The processor 25 includes one or more central processing units (CPUs). The one or more CPUs are examples of one or more processors. The processor and the CPU are each an example of a computer.

The processor 25 reads the application program 241 from the storage device 24. The processor 25 executes the application program 241 to function as an operation controller 251, a first requester 252, a second requester 253, a verifier 254, and a block generator 255.

The operation controller 251 may be implemented by circuitry such as a digital signal processor (DSP), an application specific integrated circuit (ASIC), a programmable logic device (PLD), and a field programmable gate array (FPGA). At least one of the first requester 252, the second requester 253, the verifier 254, and the block generator 255 may be implemented by circuitry such as a DSP, an ASIC, a PLD, and an FPGA.

The operation controller 251 controls the communication for appending the transaction data D1 to the blockchain BC, in other words, the operation controller 251 controls the data appending communication.

The first requester 252 transmits a request C1 to the management apparatus 10. The request C1 indicates a request for the QoS control in communication related to the transaction data D1. The communication related to the transaction data D1 includes communication of the transaction data D1 and communication of the block B1 including the transaction data D1. In other words, the communication related to the transaction data D1 means the entire communication for appending the transaction data D1 to the blockchain BC. The communication related to the transaction data D1 is an example of the data-appending communication. The QoS control is an example of control of quality of communication. The request C1 is an example of a first request to control quality of communication for appending predetermined data to the blockchain BC. The first request is a request to control quality of communication for appending the predetermined data (additional data) to the blockchain BC.

In response to receiving the request C1 from the first node (for example, node 20), the management apparatus 10 provides the first node with a one-time pass P1. The one-time pass P1 is used to execute the control indicated by the request C1. The one-time pass P1 is an example of predetermined information corresponding to the first request. The predetermined information is an example of first information. The one-time pass P1 is propagated to each of the plurality of second nodes.

The second requester 253 transmits a request C2 to the management apparatus 10. The request C2 indicates a request for the QoS control in communication in a communication path K1. The communication path K1 is an example of a first communication path. The first communication path includes a first end and a second end.

One end of the communication path K1 is a receiving node, which receives the one-time pass P1, among the plurality of second nodes in a situation in which the one-time pass P1 has been forwarded within the group A1. The one end of the communication path K1 (receiving node) is an example of the first end of the first communication path. The other end of the communication path K1 is a first connection node different from a node having forwarded the one-time pass P1 to the receiving node, the first connection node being a node among the nodes belonging to the group A1, and the first connection node being connected to the receiving node not via any of the nodes belonging to the group A1.

The other end of the communication path K1 (the first connection node) is an example of the second end of the first communication path.

The communication in the communication path K1 is communication executed by the node (receiving node) that constitutes the one end of the communication path K1, and the node (first connection node) that constitutes the other end of the communication path K1. For example, the communication in the communication path K1 includes communication of packets, the packets indicating the receiving node that constitutes the one end of the communication path K1 as a source node and indicating the first connection node that constitutes the other end of the communication path K1 as a destination node. The communication in the communication path K1 further includes communication of packets, the packets indicating the receiving node that constitutes the one end of the communication path K1 as a destination node and indicating the first connection node that constitutes the other end of the communication path K1 as a source node. The number of communication paths K1 may be one or more. The request C2 is an example of a second request to control quality of communication in the first communication path. The second request is a request to control the quality of the communication in the first communication path.

The verifier 254 inspects transaction data D1 generated by another node. The verifier 254 inspects a block B1 generated by another node.

The block generator 255 generates the block B1 including the transaction data D1. For example, the block generator 255 combines a plurality of pieces of transaction data D1 into the block B1.

A3: Nodes 30, 40, 50 and 60

Each of the nodes 30, 40, 50, and 60 includes components substantially the same as those of the node 20. The node 30, together with the node 20, executes the data appending communication (the communication for appending the transaction data D1 to the blockchain BC). The node 40, together with each of the nodes 20, 50, and 60, executes the data appending communication. The node 50, together with the node 40, executes the data appending communication. The node 60, together with the node 40, executes the data appending communication.

A4: Management Apparatus 10

Figure 5:
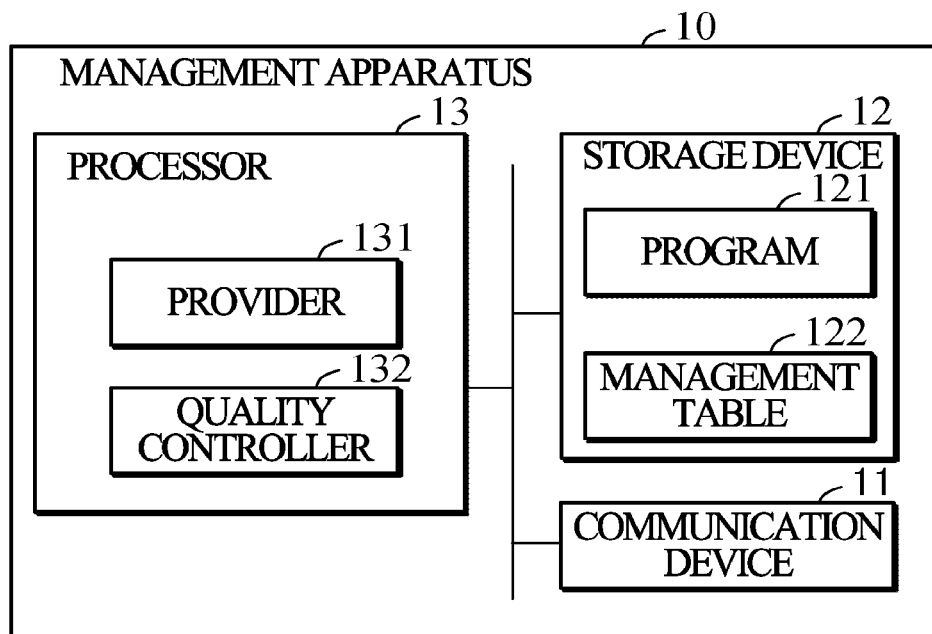
FIG. 5 is a diagram showing an example of a management apparatus 10.

FIG. 5 is a diagram showing an example of the management apparatus 10. The management apparatus 10 is a server. The management apparatus 10 includes a communication device 11, a storage device 12, and a processor 13.

The communication device 11 communicates directly or indirectly with each of the nodes 20, 30, 40, 50, and 60. The communication device 11 communicates directly or indirectly with each of the communication apparatuses 71, 72, 73, and 74.

The storage device 12 is a recording medium readable by the processor 13. The storage device 12 includes, for example, a nonvolatile memory and a volatile memory. The storage device 12 stores a program 121 and a management table 122. FIG. 6 is a diagram showing an example of the management table 122. The management table 122 is used to manage the QoS control in communication in communication paths.

Description will now be given, returning to FIG. 5. The processor 13 includes one or more CPUs. The processor 13 reads the program 121 from the storage device 12. The processor 13 executes the program 121 to function as a provider 131 and a quality controller 132. The provider 131, the quality controller 132, or a combination thereof may be implemented by circuitry such as a DSP, an ASIC, a PLD, and an FPGA.

In response to receiving the request C1 from the first node (for example, node 20), the provider 131 provides the first node with the one-time pass P1. The one-time pass P1 is forwarded within the group A1. The one-time pass P1 is propagated to each of the plurality of second nodes. The second node uses the one-time pass P1 to inform the management apparatus 10 that the communication in the communication path K1 is communication in which the QoS control is requested by the request C1

In response to receiving the one-time pass P1 in addition to the request C2 for the QoS control in the communication in the communication path K1 from the receiving node that has received the one-time pass P1, the quality controller 132 sets quality of the communication in the communication path K1 to quality that is better than or equal to a predetermined quality. The predetermined quality is an example of a first quality.

The predetermined quality is, for example, communication quality in which a communication bandwidth is "X1" Mbps." "X1" is a positive number. In this case, the quality better than or equal to the predetermined quality means quality in which a communication bandwidth is greater than or equal to "X1" Mbps. The predetermined quality is not limited to the communication quality in which the communication bandwidth is "X1" Mbps and may be communication quality in which latency is "X2" ms, for example. "X2" is a positive number. In this case, quality better than or equal to the predetermined quality means quality in which latency is less than or equal to "X2" ms. The predetermined quality may be registered in advance in the storage device 12 or may be indicated in the request C1.

In response to receiving the one-time pass P1 in addition to the request C2 from the receiving node in a situation in which the quality of the communication in the communication path K1 is less than the predetermined quality, the quality controller 132 changes the quality of the communication in the communication path K1 to quality that is better than or equal to the predetermined quality.

In response to receiving the one-time pass P1 in addition to the request C2 from the receiving node in a situation in which the quality of the communication in the communication path K1 is better than or equal to the predetermined quality, the quality controller 132 maintains the quality of the communication in the communication path K1.

A5: Description of Operation

Figure 7:
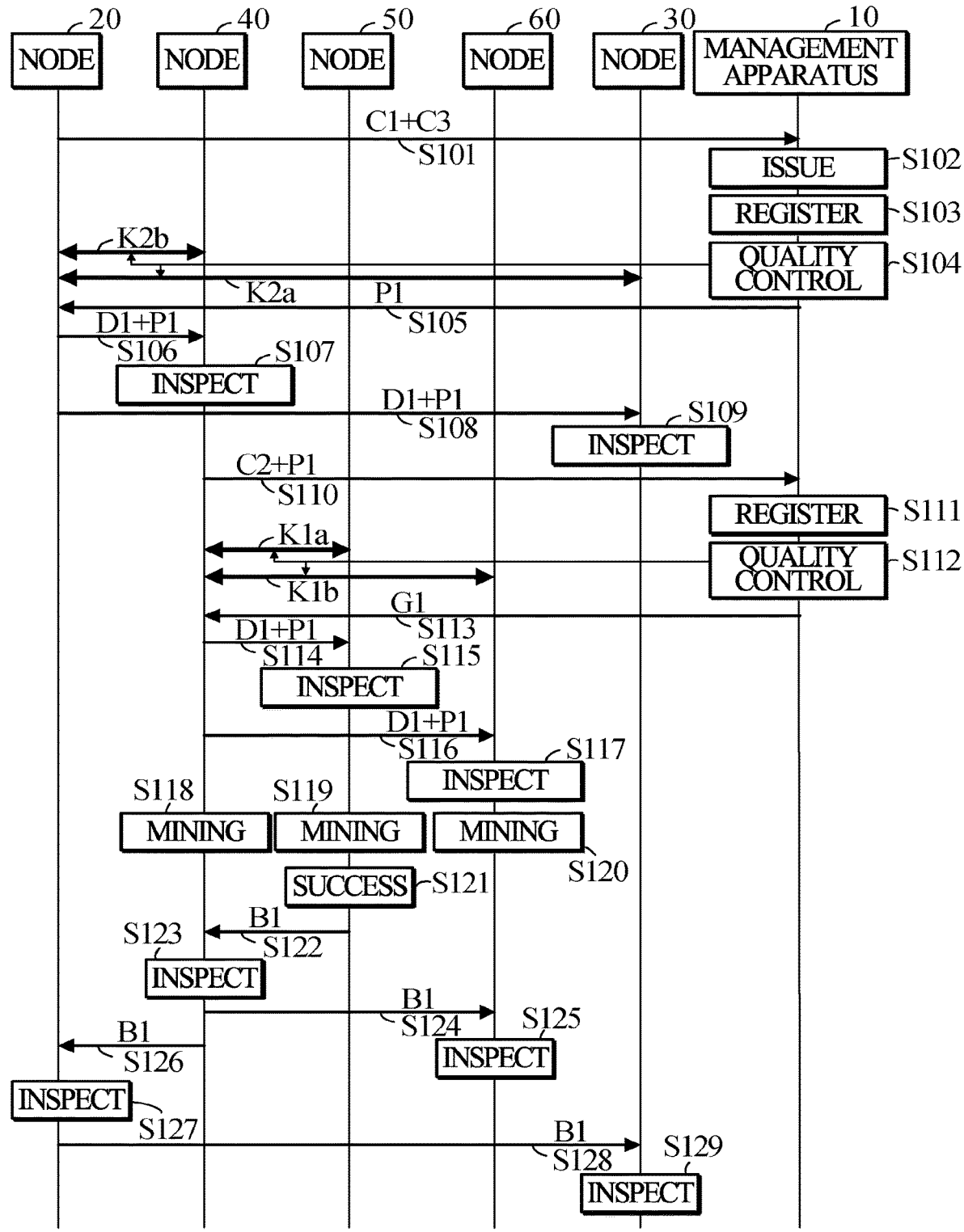
FIG. 7 is a diagram showing an operation of the network system 1.

FIG. 7 is a diagram showing an operation of the network system 1. To facilitate explanation, FIG. 7 shows an operation in a situation in which the node 20 is a transaction request node, the node 30 is a transaction client node, and each of the nodes 40, 50, and 60 is a miner node.

The transaction request node is not limited to the node 20 and may be any of the nodes 30, 40, 50, and 60. The transaction client node is not limited to the node 30 and may be any of the nodes 20, 40, 50, and 60. The transaction client node is different from the transaction request node. The miner node is not limited to each of the nodes 40, 50, and 60 and may be at least one of the nodes 20 and 30, for example. The number of miner nodes is not limited to three.

In an example shown in FIG. 7, the transaction request node is an example of the first node. A plurality of nodes other than the transaction request node is an example of the plurality of second nodes.

Each of the nodes 20, 30, 40, 50, and 60 communicates using the communication device 23 shown in FIG. 4. However, to facilitate explanation, description of the communication device 23 will be omitted. The management apparatus 10 executes communication using the communication device 11 shown in FIG. 5. However, to facilitate explanation, description of the communication device 11 will be omitted.

In response to the input device 21 of the node 20 receiving contents information indicative of the contents of transaction to be newly appended to the blockchain BC from a user of the node 20, the operation controller 251 of the node 20 generates transaction data D1 based on the contents information.

Figure 8:
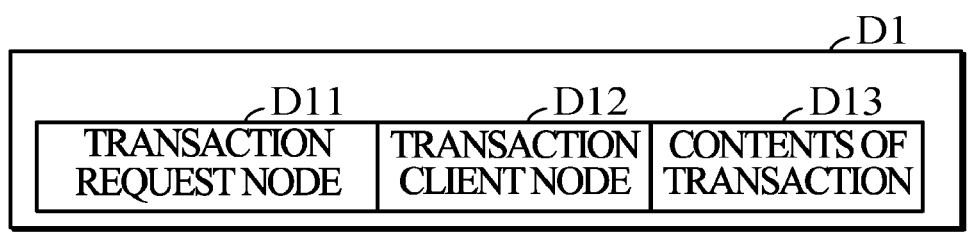
FIG. 8 is a diagram showing an example of transaction data D1.

FIG. 8 is a diagram showing an example of the transaction data D1. The transaction data D1 indicates information D11 indicative of the transaction request node, information D12 indicative of the transaction client node, and information D13 indicative of the contents of the transaction. In the example shown in FIG. 7, the information D11 indicates the node 20, whereas the information D12 indicates the node 30.

In response to the operation controller 251 of the node 20 generating the transaction data D1, the first requester 252 of the node 20 transmits a request C1 to the management apparatus 10 at step S101 shown in FIG. 7. The request C1 indicates a request for the QoS control in the communication related to the transaction data D1.

At step S101, the first requester 252 of the node 20 transmits the request C1, which is accompanied by a request C3, to the management apparatus 10. The request C3 indicates a request to control quality of communication in a communication path K2. The communication path K2 is a communication path used to provide the transaction data D1 by the node 20.

The communication in the communication path K2 is communication executed by a node that constitutes one end of the communication path K2 and a node that constitutes the other end of the communication path K2. For example, the communication in the communication path K2 includes communication of packets, the packets indicating the node that constitutes the one end of the communication path K2 as a source node and indicating the node that constitutes the other end of the communication path K2 as a destination node. The communication in the communication path K2 further includes communication of packets, the packets indicating the node that constitutes the one end of the communication path K2 as a destination node and indicating the node that constitutes the other end of the communication path K2 as a source node.

One end of the communication path K2 is the node 20. The other end of the communication path K2 is a node (second connection node), which is connected to the node 20 not via any of the plurality of second nodes (nodes 30, 40, 50, and 60), among the plurality of second nodes. In the following, the node that constitutes the other end of the communication path K2 may be referred to as a "connection-destination node N2."

When plural connection-destination nodes N2 are present, the first requester 252 of the node 20 specifies a communication path K2 for each of the plural connection-destination nodes N2. In the embodiment shown in FIG. 1, two connection-destination nodes N2 (nodes 30 and 40) are present.

Thus, the first requester 252 of the node 20 specifies two communication paths K2 (communication paths K2a and K2b) in the request C3.

One end of the communication path K2a is the node 20, whereas the other end of the communication path K2a is the node 30. One end of the communication path K2b is the node 20, whereas the other end of the communication path K2b is the node 40. The communication path K2 (each of the communication paths K2a and K2b) is an example of a second communication path. The second communication path includes a third end and a fourth end. One end of the communication path K2 (each of the communication paths K2a and K2b) is an example of the third end of the second communication path. The other end of the communication path K2 (each of the communication paths K2a and K2b) is an example of the fourth end (second connection node) of the second communication path. The request C3 is an example of a third request to control quality of communication in the second communication path. The third request is a request to control the quality of the communication in the second communication path.

The request C3 indicates, as information for identifying the node that constitutes one end of the communication path K2, an Internet Protocol (IP) address of the node that constitutes the one end of the communication path K2. The information for identifying the node that constitutes one end of the communication path K2 is not limited to the IP address of the node that constitutes the one end of the communication path K2 and may be changed as appropriate. The request C3 indicates, as information for identifying the node that constitutes the other end of the communication path K2, an IP address of the node that constitutes the other end of the communication path K2. The information for identifying the node that constitutes the other end of the communication path K2 is not limited to the IP address of the node that constitutes the other end of the communication path K2 and may be changed as appropriate.

In response to receiving the request C1 from the node 20, the provider 131 of the management apparatus 10 issues a one-time pass P1 at step S102.

In response to the request C1 being accompanied by the request C3, the provider 131 registers the communication path K2, which is indicated by the request C3, in a target communication path column 122a of the management table 122 to associate the communication path K2 with the one-time pass P1 at step S103.

FIG. 6 shows an example in which the communication path K2a (communication path between the node 20 and the node 30) and the communication path K2b (communication path between the node 20 and the node 40) are registered in the target communication path column 122a to associate the communication paths K2a and K2b with the one-time pass P1.

At step S103, the provider 131 reads, for each communication path K2, the IP address of the node that constitutes one end of the communication path K2 and the IP address of the node that constitutes the other end of the communication path K2 from the request C3. The provider 131 then registers, for each communication path K2, the IP address of the node that constitutes one end of the communication path K2 and the IP address of the node that constitutes the other end of the communication path K2 in the target communication path column 122a, as information indicative of the communication path K2, to associate the IP addresses with the one-time pass P1.

In response to newly registering information indicative of a communication path in a target communication path column 122a, the provider 131 sets a processing column 122b corresponding to the communication path in the management table 122 to "unexecuted" (not yet executed).

When the provider 131 receives the request C1 without receiving the request C3, the provider 131 does not execute step S103.

At step S104 following step S103, the quality controller 132 first specifies a target communication path (in this case, each of the communication paths K2a and K2b), which is associated with the processing column 122b in the management table 122 being set to "unexecuted." The quality controller 132 then sets quality of communication in the specified communication path to quality that is better than or equal to the predetermined quality.

When "unexecuted" is set in the processing column 122b corresponding to the communication path K2, the quality controller 132 operates as follows.

The quality controller 132 first identifies, as target packets, not only a packet that indicates one end of the communication path K2 as a source and that indicates the other end of the communication path K2 as a destination, but also a packet that indicates the one end of the communication path K2 as a destination and that indicates the other end of the communication path K2 as a source.

The quality controller 132 then sets quality of the communication in the communication path K2 to quality that is better than or equal to the predetermined quality by causing the communication apparatuses 71 to 74 to execute the priority control and the bandwidth control for the target packets.

Accordingly, the QoS control is started in the communication in the communication path K2. The quality controller 132 may cause the communication apparatuses 71 to 74 to execute either of the priority control or the bandwidth control.

The quality controller 132 then changes the processing column 122b, which corresponds to the communication path for which the QoS control is started among processing columns 122b, from "unexecuted" to "executed."

Then, at step S105, the provider 131 provides the one-time pass P1 for the node 20 that is a transmission source of the request C1. Provision of the one-time pass P1 for the transmission source of the request C1 means approval for the request C1.

In response to receiving the one-time pass P1, the operation controller 251 of the node 20 executes a handshake with the node 40 at step S106. The operation controller 251 of the node 20 transmits the one-time pass P1 and the transaction data D1 to the node 40 in the handshake. When step S106 is executed, the QoS control is executed in communication in the communication path K2b. Accordingly, duration required for the communication of the transaction data D1 is reduced.

In response to receiving the transaction data D1 from the node 20, the verifier 254 of the node 40 inspects the transaction data D1 at step S107. In the following, it is assumed that a result of the inspection of the transaction data D1 indicates it is valid.

In response to receiving the one-time pass P1, the operation controller 251 of the node 20 executes a handshake with the node 30 at step S108. The operation controller 251 of the node 20 transmits the one-time pass P1 and the transaction data D1 to the node 30 in the handshake. When step S108 is executed, the QoS control is executed in communication in the communication path K2a. Accordingly, duration required for the communication of the transaction data D1 is reduced.

In response to receiving the transaction data D1 from the node 20, the verifier 254 of the node 30 inspects the transaction data D1 at step S109. In the following, it is assumed that a result of the inspection of the transaction data D1 indicates it is valid.

Steps S108 to S109 may be executed previous to steps S106 to S107. Steps S108 to S109 may be executed in parallel with steps S106 to S107. In this case, compared to a configuration in which steps S106 to S107 and steps S108 to S109 are executed in series, it is possible to reduce duration required for steps S106 to S109.

In response to a result of the inspection of the transaction data D1 being indicative of it being valid at step S107, the second requester 253 of the node 40 transmits a request C2 and the one-time pass P1 to the management apparatus 10 at step S110.

The request C2 indicates a request to control quality of communication in a communication path K1. The communication path K1 is a communication path used to provide the transaction data D1 by the node 40.

The communication in the communication path K1 includes communication of packets, the packets indicating the node that constitutes the one end of the communication path K1 as a source node and indicating the node that constitutes the other end of the communication path K1 as a destination node. The communication in the communication path K1 further includes communication of packets, the packets indicating the node that constitutes the one end of the communication path K1 as a destination node and indicating the node that constitutes the other end of the communication path K1 as a source node.

One end of the communication path K1 is the node 40. The node 40 is an example of the receiving node. The other end of the communication path K1, which is different from a node (node 20) having forwarded the one-time pass P1 to the node 40, is a node (first connection node), which is connected to the node 40 not via any of the nodes belonging to the group A1, among the nodes belonging to the group A1. In the following, the node that constitutes the other end of the communication path K1 may be referred to as a "connection-destination node N1."

When plural connection-destination nodes N1 are present, the second requester 253 of the node 40 specifies a communication path K1 for each of the plural connection-destination nodes N1. In the embodiment shown in FIG. 1, two connection-destination nodes N1 (nodes 50 and 60) are present. Thus, the second requester 253 of the node 40 specifies two communication paths K1 (communication paths K1a and K1b) in the request C2.

One end of the communication path K1a is the node 40, whereas the other end of the communication path K1a is the node 50. One end of the communication path K1b is the node 40, whereas the other end of the communication path K1b is the node 60. The communication path K1 (each of the communication paths K1a and K1b) is an example of the first communication path.

The request C2 indicates, as information for identifying the node that constitutes one end of the communication path K1, an IP address of the node that constitutes the one end of the communication path K1. The information for identifying the node that constitutes one end of the communication path K1 is not limited to the IP address of the node that constitutes the one end of the communication path K1 and may be changed as appropriate. The request C2 indicates, as information for identifying the node that constitutes the other end of the communication path K1, an IP address of the node that constitutes the other end of the communication path K1. The information for identifying the node that constitutes the other end of the communication path K1 is not limited to the IP address of the node that constitutes the other end of the communication path K1 and may be changed as appropriate.

In response to receiving the one-time pass P1 in addition to the request C2, the quality controller 132 of the management apparatus 10 registers the communication path K1, which is indicated by the request C2, in a target communication path column 122a of the management table 122 to associate the communication path K1 with the one-time pass P1 at step S111.

FIG. 6 shows an example in which the communication path K1a (communication path between the node 40 and the node 50) and the communication path K1b (communication path between the node 40 and the node 60) are registered in the target communication path column 122a to associate the communication paths K1a and K1b with the one-time pass P1.

At step S111, the quality controller 132 reads, for each communication path K1, the IP address of the node that constitutes one end of the communication path K1 and the IP address of the node that constitutes the other end of the communication path K1 from the request C2. The quality controller 132 then registers, for each communication path K1, the IP address of the node that constitutes one end of the communication path K1 and the IP address of the node that constitutes the other end of the communication path K1 in the target communication path column 122a, as information indicative of the communication path K1, to associate the IP addresses with the one-time pass P1.

In response to newly registering information indicative of a communication path in a target communication path column 122a, the quality controller 132 sets a processing column 122b corresponding to the communication path in the management table 122 to "unexecuted" (not yet executed).

When the quality controller 132 receives the request C2 without receiving the one-time pass P1, the quality controller 132 does not execute step S111.

At step S112 following step S111, the quality controller 132 first specifies a target communication path (in this case, each of the communication paths K1a and K1b), which is associated with the processing column 122b in the management table 122 being set to "unexecuted." The quality controller 132 then sets quality of communication in the specified communication path to quality that is better than or equal to the predetermined quality. A method of setting the quality of the communication in the specified communication path to quality that is better than or equal to the predetermined quality is substantially the same as that of step S104.

When "unexecuted" is set in the processing column 122b corresponding to the communication path K1, the quality controller 132 operates as follows.

The quality controller 132 first identifies, as target packets, not only a packet that indicates one end of the communication path K1 as a source and that indicates the other end of the communication path K1 as a destination, but also a packet that indicates the one end of the communication path K1 as a destination and that indicates the other end of the communication path K1 as a source.

The quality controller 132 then sets quality of the communication in the communication path K1 to quality that is better than or equal to the predetermined quality by causing the communication apparatuses 71 to 74 to execute the priority control and the bandwidth control for the target packets.

Accordingly, the QoS control is started in the communication in the communication path K1. The quality controller 132 may cause the communication apparatuses 71 to 74 to execute either of the priority control or the bandwidth control.

The quality controller 132 then changes the processing column 122b, which corresponds to the communication path for which the QoS control is started among processing columns 122b, from "unexecuted" to "executed."

Then, at step S113, the quality controller 132 transmits execution information G1, which indicates execution of the QoS control, to the node 40 that is a transmission source of the request C2.

In response to receiving the execution information G1, the operation controller 251 of the node 40 executes a handshake with the node 50 at step S114. The operation controller 251 of the node 40 transmits the one-time pass P1 and the transaction data D1 to the node 50 in the handshake. When step S114 is executed, the QoS control is executed in communication in the communication path K1a. Accordingly, duration required for the communication of the transaction data D1 is reduced.

In response to receiving the transaction data D1 from the node 40, the verifier 254 of the node 50 inspects the transaction data D1 at step S115. In the following, it is assumed that a result of the inspection of the transaction data D1 indicates it is valid.

In response to receiving the execution information G1, the operation controller 251 of the node 40 executes a handshake with the node 60 at step S116. The operation controller 251 of the node 40 transmits the one-time pass P1 and the transaction data D1 to the node 60 in the handshake. When step S116 is executed, the QoS control is executed in communication in the communication path K1b. Accordingly, duration required for the communication of the transaction data D1 is reduced.

In response to receiving the transaction data D1 from the node 40, the verifier 254 of the node 60 inspects the transaction data D1 at step S117. In the following, it is assumed that a result of the inspection of the transaction data D1 indicates it is valid.

Steps S116 to S117 may be executed previous to steps S114 to S115. Steps S116 to S117 may be executed in parallel with steps S114 to S115. In this case, compared to a configuration in which steps S114 to S115 and steps S116 to S117 are executed in series, it is possible to reduce duration required for steps S114 to S117.

In response to step S116 being completed, the block generator 255 of the node 40 starts generating (mining) a block B1 including the transaction data D1 at step S118.

In response to step S115 being completed, the block generator 255 of the node 50 starts generating (mining) a block B1 including the transaction data D1 at step S119.

In response to step S117 being completed, the block generator 255 of the node 60 starts generating (mining) a block B1 including the transaction data D1 at step S120.

In response to the block generator 255 of the node 50 succeeding in generating (mining) the block B1 including the transaction data D1 at step S121, the operation controller 251 of the node 50 connects the block B1 to the blockchain BC in the storage device 24. The operation controller 251 of the node 50 then transmits the block B1 to the node 40 at step S122. When step S122 is executed, the QoS control is executed in communication in the communication path K1a. Accordingly, duration required for the communication of the block B1 is reduced.

In response to receiving the block B1, the verifier 254 of the node 40 inspects the block B1 at step S123. In response to a result of the inspection of the block B1 being indicative of it being valid, the verifier 254 of the node 40 connects the block B1 to the blockchain BC in the storage device 24 of the node 40.

The operation controller 251 of the node 40 then transmits the block B1 to the node 60 at step S124. When step S124 is executed, the QoS control is executed in the communication in the communication path K1b. Accordingly, the duration required for the communication of the block B1 is reduced.

In response to receiving the block B1, the verifier 254 of the node 60 inspects the block B1 at step S125. In response to a result of the inspection of the block B1 being indicative of it being valid, the verifier 254 of the node 60 connects the block B1 to the blockchain BC in the storage device 24 of the node 60.

Following step S124, the operation controller 251 of the node 40 transmits the block B1 to the node 20 at step S126. When step S126 is executed, the QoS control is executed in the communication path K2b. Accordingly, the duration required for the communication of the block B1 is reduced. Step S126 may be executed previous to step S124, or alternatively, step S126 may be executed in parallel with step S124.

In response to receiving the block B1, the verifier 254 of the node 20 inspects the block B1 at step S127. In response to a result of the inspection of the block B1 being indicative of it being valid, the verifier 254 of the node 20 connects the block B1 to the blockchain BC in the storage device 24 of the node 20.

The operation controller 251 of the node 20 then transmits the block B1 to the node 30 at step S128. When step S128 is executed, the QoS control is executed in the communication in the communication path K2a. Accordingly, the duration required for the communication of the block B1 is reduced.

In response to receiving the block B1, the verifier 254 of the node 30 inspects the block B1 at step S129. In response to a result of the inspection of the block B1 being indicative of it being valid, the verifier 254 of the node 30 connects the block B1 to the blockchain BC in the storage device 24 of the node 30.

A6: Summary of First Embodiment

According to the first embodiment, in response to receiving the request C1 to control quality of communication for appending data to the blockchain BC from the first node (for example, node 20), the provider 131 provides the first node with a one-time pass P1. In response to receiving the one-time pass P1 in addition to the request C2 to control the quality of the communication in the first communication path from the receiving node that has received the one-time pass P1 during forwarding of the one-time pass P1 within the group A1, the quality controller 132 sets the quality of the communication in the first communication path to quality that is better than or equal to the predetermined quality. One end of the first communication path is the receiving node. The other end of the first communication path, which is different from a node having forwarded the one-time pass P1 to the receiving node, is a node, which is connected to the receiving node not via any of the nodes belonging to the group A1, among the nodes belonging to the group A1.

Accordingly, compared to a configuration in which communication in any of the communication paths between the plural nodes belonging to the group A1 is not set to quality that is better than or equal to the predetermined quality, it is possible to reduce latency in the timing of appending the data to the blockchain BC. Therefore, it is possible to assist a node to reduce the latency in the timing of appending the data to the blockchain BC.

In addition, the QoS control is executed in response to generation of the transaction data D1. Therefore, it is possible to start the QoS control from a timing at which the QoS control is required.

In addition, it is possible to execute the QoS control in only communication in a communication path required to append the data to the blockchain BC.

B: Modifications

The following are examples of modifications of the embodiment described above. Two or more modifications freely selected from the following modifications may be combined as long as no conflict arises from such combination.

B1: First Modification

In the first embodiment, the QoS control may not be executed in the communication of the transaction data D1.

A modification of the first embodiment will be described as a first modification, and in the modification, the QoS control is not executed in the communication of the transaction data D1, whereas the QoS control is executed in the communication of the block B1 including the transaction data D1. In the following, the first modification will be described focusing on points different from the first embodiment.

Figure 9:
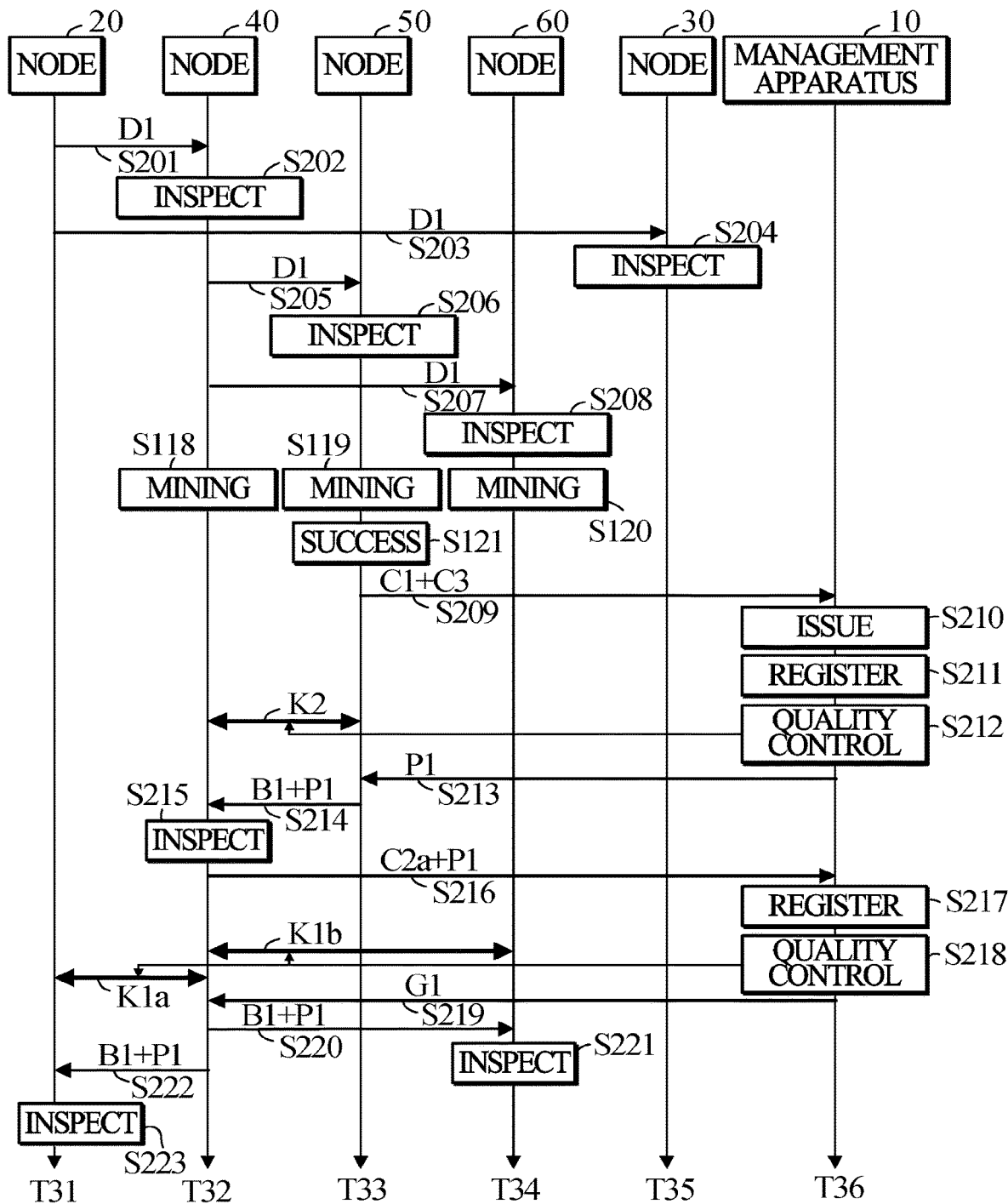
FIG. 9 is a diagram showing an operation of a first modification.
Figure 10:
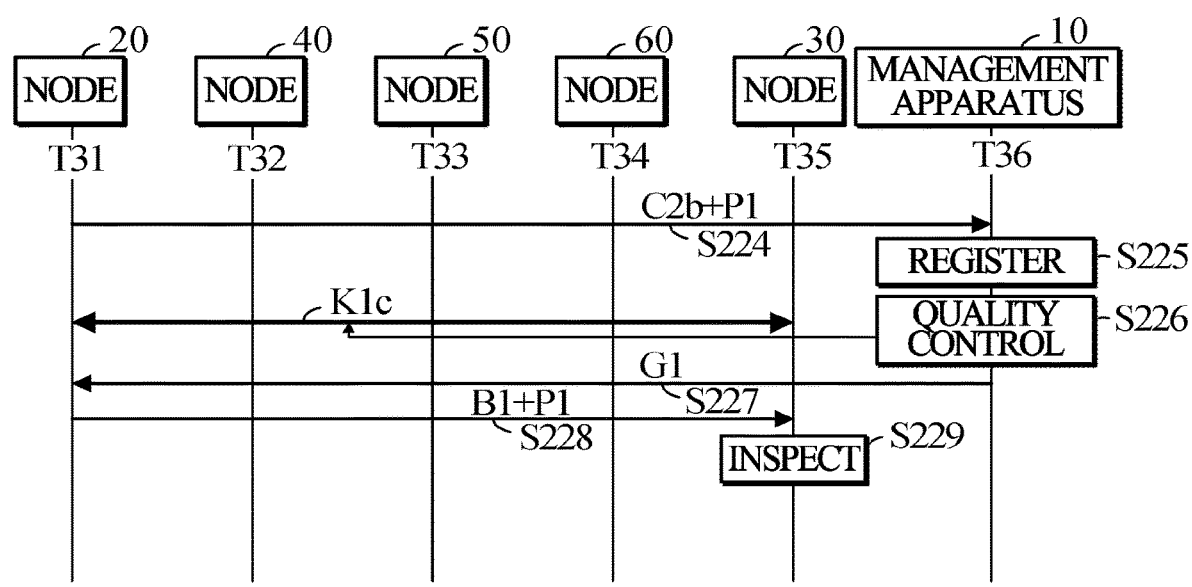
FIG. 10 is a diagram showing an operation of the first modification.

A hardware configuration of the first modification is substantially the same as that of the first embodiment. FIG. 9 and FIG. 10 are diagrams showing an operation of the first modification.

In the first modification, the node 50, which succeeds in generating (mining) a block B1, becomes the starting point, and the QoS control is started. In this case, the node 50 is an example of the first node, and the nodes 20, 30, 40, and 60 are examples of the plurality of second nodes.

In response to the input device 21 of the node 20 receiving contents information indicative of the contents of transaction to be newly appended to the blockchain BC from the user of the node 20, the operation controller 251 of the node 20 generates transaction data D1 based on the contents information.

In response to the operation controller 251 of the node 20 generating the transaction data D1, the first requester 252 of the node 20 transmits the transaction data D1 to the node 40 at step S201.

In response to receiving the transaction data D1 from the node 20, the verifier 254 of the node 40 inspects the transaction data D1 at step S202. In the following, it is assumed that a result of the inspection of the transaction data D1 indicates it is valid.

In response to completing step S201, the operation controller 251 of the node 20 transmits the transaction data D1 to the node 30 at step S203.

In response to receiving the transaction data D1 from the node 20, the verifier 254 of the node 30 inspects the transaction data D1 at step S204. In the following, it is assumed that a result of the inspection of the transaction data D1 indicates it is valid.

Steps S203 to S204 may be executed previous to steps S201 to S202. Steps S203 to S204 may be executed in parallel with steps S201 to S202. In this case, compared to a configuration in which steps S201 to S202 and steps S203 to S204 are executed in series, it is possible to reduce duration required for steps S201 to S204.

In response to a result of the inspection of the transaction data D1 being indicative of it being valid at step S202, the operation controller 251 of the node 40 transmits the transaction data D1 to the node 50 at step S205.

In response to receiving the transaction data D1 from the node 40, the verifier 254 of the node 50 inspects the transaction data D1 at step S206. In the following, it is assumed that a result of the inspection of the transaction data D1 indicates it is valid.

In response to completing step S205, the operation controller 251 of the node 40 transmits the transaction data D1 to the node 60 at step S207.

In response to receiving the transaction data D1 from the node 40, the verifier 254 of the node 60 inspects the transaction data D1 at step S208. In the following, it is assumed that a result of the inspection of the transaction data D1 indicates it is valid.

Steps S207 to S208 may be executed previous to steps S205 to S206. Steps S207 to S208 may be executed in parallel with steps S205 to S206. In this case, compared to a configuration in which steps S205 to S206 and steps S207 to S208 are executed in series, it is possible to reduce duration required for steps S205 to S208.

In response to step S207 being completed, the block generator 255 of the node 40 starts generating (mining) a block B1 including the transaction data D1 at step S118.

In response to step S206 being completed, the block generator 255 of the node 50 starts generating (mining) a block B1 including the transaction data D1 at step S119.

In response to step S208 being completed, the block generator 255 of the node 60 starts generating (mining) a block B1 including the transaction data D1 at step S120.

In response to the block generator 255 of the node 50 succeeding in generating (mining) the block B1 including the transaction data D1 at step S121, the first requester 252 of the node 50 transmits the request C1 to the management apparatus 10 at step S209. The request C1 indicates a request for the QoS control in communication related to the transaction data D1.

At step S209, the first requester 252 of the node 50 transmits the request C1, which is accompanied by a request C3, to the management apparatus 10. The request C3 indicates a request to control quality of communication in a communication path K2. In this case, the communication path K2 is a communication path used to provide the block B1 by the node 50. One end of the communication path K2 is the node 50. The other end of the communication path K2 is the node 40 (connection-destination node N2), which is connected to the node 50 not via any of the plurality of second nodes (nodes 30, 40, 50, and 60), among the plurality of second nodes. In the embodiment shown in FIG. 1, one connection-destination node N2 (node 40) is present. Accordingly, the first requester 252 of the node 50 specifies one communication path K2.

In response to receiving the request C1 from the node 50, the provider 131 of the management apparatus 10 issues a one-time pass P1 at step S210.

In response to the request C1 being accompanied by the request C3, the provider 131 registers the communication path K2, which is indicated by the request C3, in a target communication path column 122a of the management table 122 to associate the communication path K2 with the one-time pass P1 at step S211.

In response to newly registering information indicative of a communication path in a target communication path column 122a, the provider 131 sets a processing column 122b corresponding to the communication path in the management table 122 to "unexecuted" (not yet executed).

When the provider 131 receives the request C1 without receiving the request C3, the provider 131 does not execute step S211.

At step S212 following step S211, the quality controller 132 first specifies a target communication path (in this case, the communication path K2), which is associated with the processing column 122b in the management table 122 being set to "unexecuted." The quality controller 132 then sets quality of communication in the specified communication path to quality that is better than or equal to the predetermined quality. A method of setting the quality of the communication in the specified communication path to quality that is better than or equal to the predetermined quality is substantially the same as that of step S104.

The quality controller 132 then changes the processing column 122b, which corresponds to the communication path for which the QoS control is started among processing columns 122b, from "unexecuted" to "executed."

Then, at step S213, the provider 131 provides the one-time pass P1 for the node 50 that is a transmission source of the request C1.

In response to receiving the one-time pass P1, the operation controller 251 of the node 50 transmits the one-time pass P1 and the block B1 to the node 40 at step S214. When step S214 is executed, the QoS control is executed in communication in the communication path K2. Accordingly, duration required for the communication of the block B1 is reduced.

In response to receiving the block B1 from the node 50, the verifier 254 of the node 40 inspects the block B1 at step S215.

In response to a result of the inspection of the block B1 being indicative of it being valid at step S215, the second requester 253 of the node 40 transmits a request C2a and the one-time pass P1 to the management apparatus 10 at step S216.

The request C2a indicates a request to control quality of communication in a communication path K1. In this case, the communication path K1 is a communication path used to provide the block B1 by the node 40. One end of the communication path K1 is the node 40. The node 40 is an example of the receiving node. The other end of the communication path K1, which is different from a node (node 50) having forwarded the one-time pass P1 to the node 40, is a node (connection-destination node N1), which is connected to the node 40 not via any of the nodes belonging to the group A1, among the nodes belonging to the group A1.

When plural connection-destination nodes N1 are present, the second requester 253 of the node 40 specifies a communication path K1 for each of the plural connection-destination nodes N1. In the embodiment shown in FIG. 1, two connection-destination nodes N1 (nodes 20 and 60) are present. Thus, the second requester 253 of the node 40 specifies two communication paths K1 (communication paths K1a and K1b).

In this case, one end of the communication path K1a is the node 40, whereas the other end of the communication path K1a is the node 20. One end of the communication path K1b is the node 40, whereas the other end of the communication path K1b is the node 60. The communication path K1 (each of the communication paths K1a and K1b) is an example of the first communication path. The request C2a is an example of the second request to control quality of communication in the first communication path.

The request C2a indicates, as information for identifying the node that constitutes one end of the communication path K1, an IP address of the node that constitutes the one end of the communication path K1. The information for identifying the node that constitutes one end of the communication path K1 is not limited to the IP address of the node that constitutes the one end of the communication path K1 and may be changed as appropriate. The request C2a indicates, as information for identifying the node that constitutes the other end of the communication path K1, an IP address of the node that constitutes the other end of the communication path K1. The information for identifying the node that constitutes the other end of the communication path K1 is not limited to the IP address of the node that constitutes the other end of the communication path K1 and may be changed as appropriate.

In response to receiving the one-time pass P1 in addition to the request C2a, the quality controller 132 of the management apparatus 10 registers the communication path K1, which is indicated by the request C2a, in a target communication path column 122a of the management table 122 to associate the communication path K1 with the one-time pass P1 at step S217.

In response to newly registering information indicative of a communication path in a target communication path column 122a, the quality controller 132 sets a processing column 122b corresponding to the communication path in the management table 122 to "unexecuted" (not yet executed).

When the quality controller 132 receives the request C2a without receiving the one-time pass P1, the quality controller 132 does not execute step S217.

At step S218 following step S217, the quality controller 132 first specifies a target communication path (in this case, each of the communication paths K1a and K1b), which is associated with the processing column 122b in the management table 122 being set to "unexecuted." The quality controller 132 then sets quality of communication in the specified communication path to quality that is better than or equal to the predetermined quality. A method of setting the quality of the communication in the specified communication path to quality that is better than or equal to the predetermined quality is substantially the same as that of step S112.

The quality controller 132 then changes the processing column 122b, which corresponds to the communication path for which the QoS control is started among processing columns 122b, from "unexecuted" to "executed."

Then, at step S219, the quality controller 132 transmits execution information G1, which indicates execution of the QoS control, to the node 40 that is a transmission source of the request C2a.

In response to receiving the execution information G1, the operation controller 251 of the node 40 transmits the one-time pass P1 and the block B1 to the node 60 at step S220. When step S220 is executed, the QoS control is executed in communication in the communication path K1b. Accordingly, duration required for the communication of the block B1 is reduced.

In response to receiving the block B1 from the node 40, the verifier 254 of the node 60 inspects the block B1 at step S221. In response to a result of the inspection of the block B1 being indicative of it being valid, the verifier 254 of the node 60 connects the block B1 to the blockchain BC in the storage device 24 of the node 60.

In response to completing step S220, the operation controller 251 of the node 40 transmits the one-time pass P1 and the block B1 to the node 60 at step S222. When step S222 is executed, the QoS control is executed in communication in the communication path K1a. Accordingly, duration required for the communication of the block B1 is reduced.

In response to receiving the block B1 from the node 40, the verifier 254 of the node 20 inspects the block B1 at step S223. In response to a result of the inspection of the block B1 being indicative of it being valid, the verifier 254 of the node 20 connects the block B1 to the blockchain BC in the storage device 24 of the node 20.

Steps S222 to S223 may be executed previous to steps S220 to S221. Steps S222 to S223 may be executed in parallel with steps S220 to S221. In this case, compared to a configuration in which steps S220 to S221 and steps S222 to S223 are executed in series, it is possible to reduce duration required for steps S220 to S223.

In response to a result of the inspection of the block B1 being indicative of it being valid at step S223, the second requester 253 of the node 20 transmits a request C2b and the one-time pass P1 to the management apparatus 10 at step S224.

The request C2b indicates a request to control quality of communication in a communication path K1c. The communication path K1c is a communication path used to provide the block B1 by the node 20. One end of the communication path K1c is the node 20. The node 20 is an example of the receiving node. The other end of the communication path K1c, which is different from a node (node 40) having forwarded the one-time pass P1 to the node 20, is a node (connection-destination node N3), which is connected to the node 20 not via any of the nodes belonging to the group A1, among the nodes belonging to the group A1. In the embodiment shown in FIG. 1, one connection-destination node N3 (node 30) is present. Thus, the second requester 253 of the node 20 specifies one communication path K1c. The communication path K1c is an example of the first communication path. The request C2b is an example of the second request to control quality of communication in the first communication path.

The request C2b indicates, as information for identifying the node that constitutes one end of the communication path K1c, an IP address of the node that constitutes the one end of the communication path K1c. The information for identifying the node that constitutes one end of the communication path K1c is not limited to the IP address of the node that constitutes the one end of the communication path K1c and may be changed as appropriate. The request C2b indicates, as information for identifying the node that constitutes the other end of the communication path K1c, an IP address of the node that constitutes the other end of the communication path K1c. The information for identifying the node that constitutes the other end of the communication path K1c is not limited to the IP address of the node that constitutes the other end of the communication path K1c and may be changed as appropriate.

In response to receiving the one-time pass P1 in addition to the request C2b, the quality controller 132 of the management apparatus 10 registers the communication path K1c, which is indicated by the request C2b, in a target communication path column 122a of the management table 122 to associate the communication path K1c with the one-time pass P1 at step S225.

In response to newly registering information indicative of a communication path in a target communication path column 122a, the quality controller 132 sets a processing column 122b corresponding to the communication path in the management table 122 to "unexecuted" (not yet executed).

When the quality controller 132 receives the request C2b without receiving the one-time pass P1, the quality controller 132 does not execute step S225.

At step S226 following step S225, the quality controller 132 first specifies a target communication path (in this case, the communication path K1c), which is associated with the processing column 122b in the management table 122 being set to "unexecuted." The quality controller 132 then sets quality of communication in the specified communication path to quality that is better than or equal to the predetermined quality. A method of setting the quality of the communication in the specified communication path to quality that is better than or equal to the predetermined quality is substantially the same as that of step S112.

The quality controller 132 then changes the processing column 122b, which corresponds to the communication path for which the QoS control is started among processing columns 122b, from "unexecuted" to "executed."

Then, at step S227, the quality controller 132 transmits execution information G1, which indicates execution of the QoS control, to the node 20 that is a transmission source of the request C2b.

In response to receiving the execution information G1, the operation controller 251 of the node 20 transmits the one-time pass P1 and the block B1 to the node 30 at step S228. When step S228 is executed, the QoS control is executed in communication in the communication path K1c. Accordingly, duration required for the communication of the block B1 is reduced.

In response to receiving the block B1 from the node 20, the verifier 254 of the node 30 inspects the block B1 at step S229. In response to a result of the inspection of the block B1 being indicative of it being valid, the verifier 254 of the node 30 connects the block B1 to the blockchain BC in the storage device 24 of the node 30.

Low latency in the communication of the block B1 increases the probability of the block B1 arriving at each node earlier than another block B1. When the block B1 arrives at each node earlier than another block B1, the probability increases that the block B1 will be connected to the blockchain BC. Thus, low latency in the communication of the block B1 is desirable not only for a user who expects early finalization of the transaction data D1, but also for a miner node that generates the block B1.

According to the first modification, the QoS control is not executed in the communication of the transaction data D1, whereas the QoS control is executed in the communication of the block B1 including the transaction data D1. Thus, it is possible to reduce latency in the communication of the block B1. Therefore, compared to a configuration in which the QoS control is executed in neither the communication of the transaction data D1 nor the communication of the block B1 including the transaction data D1, it is possible to quickly finalize the transaction data D1 and to increase the probability of the block B1 being connected to the blockchain BC.

B2: Second Modification

In the first embodiment, the quality controller 132 may determine authenticity of a transmission source of the request C2.

The quality controller 132 receives a destination list, which is indicative of a destination node of a one-time pass P1, from a forwarding source node (for example, node 20) of the one-time pass P1 among the nodes of the group A1. The destination list is an example of node information indicative of a destination node of the predetermined information. In response to a transmission source node of a request C2 and the one-time pass P1 corresponding to the node indicated by the destination list, the quality controller 132 determines that the one-time pass P1 in addition to the request C2 is received from a receiving node that has received the one-time pass P1 from the forwarding source node of the one-time pass P1. In response to the transmission source node of the request C2 and the one-time pass P1 not corresponding to the node indicated by the destination list, the quality controller 132 determines that the request C2 is invalid.

For example, the quality controller 132 receives the destination list, which is indicative of destination nodes (nodes 30 and 40) of a one-time pass P1, from the node 20, which has forwarded the one-time pass P1 to the nodes 30 and 40. In response to a transmission source of the request C2 and the one-time pass P1 being indicated by the destination list, the quality controller 132 determines that the request C2 and the one-time pass P1 is received from a receiving node (node 30 or 40) that has received the one-time pass P1 from the node 20. In response to the transmission source of the request C2 and the one-time pass P1 not being indicated by the destination list L1, the quality controller 132 determines that the request C2 is invalid.

In the first modification, at least one of the requests C2a and C2b may be used instead of the request C2.

For example, the quality controller 132 receives a destination list, which is indicative of a destination node of a one-time pass P1, from a forwarding source node (for example, node 20) of the one-time pass P1 among the nodes of the group A1.

In response to a transmission source node of a request C2a and the one-time pass P1 being indicated by the destination list, the quality controller 132 determines that the one-time pass P1 in addition to the request C2a is received from a receiving node that has received the one-time pass P1 from the forwarding source node of the one-time pass P1. In response to the transmission source node of the request C2a and the one-time pass P1 not being indicated by the destination list, the quality controller 132 determines that the request C2a is invalid.

In response to a transmission source node of a request C2b and the one-time pass P1 being indicated by the destination list, the quality controller 132 determines that the one-time pass P1 in addition to the request C2b is received from a receiving node that has received the one-time pass P1 from the forwarding source node of the one-time pass P1. In response to the transmission source node of the request C2b and the one-time pass P1 not being indicated by the destination list, the quality controller 132 determines that the request C2b is invalid.

According to the second modification, it is possible to invalidate each of the requests C2, C2a, and C2b from a node that has obtained a one-time pass P1 via an illegitimate route, for example.

B3: Third Modification

In the first embodiment and the first to second modifications, the quality controller 132 may restore the quality of the communication, which is set to the quality better than or equal to the predetermined quality, to quality of communication set previous to setting of the quality better than or equal to the predetermined quality.

The request C1 requests control of the quality of the communication related to the transaction data D1 within the group A1. In other words, the request C1 is a request to control the quality of the communication related to the transaction data D1 within the group A1. The transaction data D1 indicates one of the plurality of second nodes as a transaction client node (see FIG. 8). In response to a notice indicative of receipt of the block B1 including the transaction data D1 by the transaction client node (transaction node), the quality controller 132 restores the quality of the communication related to the transaction data D1 within the group A1, which is better than or equal to the predetermined quality, to the quality set previous to setting of the quality better than or equal to the predetermined quality.

For example, in response to the node 30, which is indicated as the transaction client node by the transaction data D1, receiving the block B1 including the transaction data D1, the operation controller 251 of the node 30 transmits a notice M1 to the management apparatus 10. The notice M1 indicates receipt of the block B1 including the transaction data D1 by the transaction client node.

In response to the notice M1, the quality controller 132 of the management apparatus 10 restores the quality of the communication, which is set to the quality better than or equal to the predetermined quality, to the quality of communication set previous to setting of the quality better than or equal to the predetermined quality. For example, in response to receiving the notice M1, the quality controller 132 deletes information (one-time pass P1 and communication path) that is registered in the management table 122 and information ("unexecuted" and "executed") that is set in the management table 122. The quality controller 132 then executes control of quality of communication using the management table 122 (for example, control at step S104). In this case, the communication apparatuses 71 to 74 return to a state before the communication apparatuses 71 to 74 are controlled by the quality controller 132 (for example, a predetermined state).

For example, in response to predetermined duration (for example, two minutes) having elapsed since receipt of the notice M1, the quality controller 132 restores the quality of the communication, which is set to the quality better than or equal to the predetermined quality, to the quality of the communication set previous to setting of the quality better than or equal to the predetermined quality. The predetermined duration is not limited to two minutes and may be longer than two minutes or may be shorter than two minutes. It is desirable that the predetermined duration be longer than the duration required for a new block B1 to arrive at all the nodes of the group A1.

According to the third modification, it is possible to substantially prevent quality of communication within the group A1 from being at a high level for a duration longer than necessary.

B4: Fourth Modification

In the first embodiment and the first to third modifications, instead of executing the QoS control in communication in all of the communication paths between the plural nodes belonging to the group A1, the quality controller 132 may execute the QoS control in communication in one or some of the communication paths.

According to the fourth modification, compared to a configuration in which the QoS control is not executed in communication in either of the communication paths between the plural nodes belonging to the group A1, it is possible to reduce latency in the timing of appending data to the blockchain BC.

C: Other Matters (1) In each of the first embodiment and the first modification to the fourth modification, the storage devices 12 and 24 may include flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted from a network via telecommunication lines.

(2) Each of the first embodiment and the first modification to the fourth modification may be at least one of systems using Long Term Evolution (LTE), LTE-advanced (LTE-A), SUPER 3G, IMT-Advanced, 4th generation mobile communication system (4G), 5th generation mobile communication system (5G), future radio access (FRA), new Radio (NR), W-CDMA (registered trademark), GSM (registered trademark), CDMA2000, Ultra Mobile Broadband (UMB), IEEE 802.11 [Wi-Fi (registered trademark)], IEEE 802.16 [WiMAX (registered trademark)], IEEE 802.20, Ultra-wideband (UWB), Bluetooth (registered trademark), and other appropriate systems, and next-generation systems extended based on the system.

(3) The information, etc., described in each of the first embodiment and the first modification to the sixth modification may be explained by use of various techniques. For example, data, instructions, etc., may be presented by freely selected combination of voltages, currents, electromagnetic waves, magnetic fields or magnetic particles, light fields or photons.

It should be noted that the terms described in this specification, the terms necessary for understanding this specification, or the terms described in this specification and the terms necessary for understanding this specification may be replaced by terms having the same or similar meanings.

(4) In each of the first embodiment and the first modification to the fourth modification, the input and output of information, or the input or output of information, etc., may be stored in a specific location (e.g., memory) or may be managed by use of a management table. The information, etc., that is, the input and output, or the input or the output, may be overwritten, updated, or appended. The information, etc., that is output may be deleted. The information, etc., that is input may be transmitted to other devices.

(5) In each of the first embodiment and the first modification to the fourth modification, determination may be made based on values that can be represented by one bit (0 or 1), may be made based on Boolean values (true or false), or may be made based on comparing numerical values (for example, comparison with a predetermined value).

(6) The order of processes, sequences, flowcharts, etc., that have been used to describe the first embodiment and the first modification to the fourth modification may be changed as long as they do not conflict. For example, although a variety of methods has been illustrated in this disclosure with a variety of elements of steps in exemplary orders, the specific orders presented herein are by no means limiting.

(7) Each function shown in FIG. 4 or 5 is implemented by any combination of hardware and software. Each function may be implemented by a single device, or may be implemented by two or more separate devices.

(8) The programs shown in each of the first embodiment and the first through the fourth modifications should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software, instructions, etc., may be transmitted and received via communication media. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(9) In each of the first embodiment and the first modification to the fourth modification, the terms "system" and "network" are used interchangeably.

(10) In each of the first embodiment and the first modification to the fourth modification, at least one of the nodes 20, 30, 40, 50 and 60 may be a mobile station. A mobile station may be referred to, by one skilled in the art as a "subscriber station", a "mobile unit", a "subscriber unit", a "wireless unit", a "remote unit", a "mobile device", a "wireless device" a "wireless communication device", a "remote device", a "mobile subscriber station", an "access terminal", a "mobile terminal", a "wireless terminal", a "remote terminal", a "handset", a "user agent", a "mobile client", a "client", or some other suitable terms.

(11) In each of the first embodiment and the first modification to the fourth modification, the phrase "based on" as used in this specification does not mean "based only on", unless specified otherwise. In other words, the phrase "based on" means both "based only on" and "based at least on."

(12) Any reference to an element using the designations "first", and "second", etc., used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(13) As long as terms such as "include", "comprise" and modifications thereof are used in each of the first embodiment and the first modification to the fourth modification, these terms are intended to be inclusive, in a manner similar to the way the term "provide" is used. In addition, the term "or" used in the specification or in claims is not intended to be an exclusive OR.

(14) In the disclosure, for example, when articles such as "a", "an", and "the" in English are added in translation, these articles include plurals unless otherwise clearly indicated by the context.

(15) The term "device" in this specification may be understood as another term such as a circuit, a device a unit, etc.

(16) It is obvious to those skilled in the art that the present invention is not limited to the embodiments described in the specification. The present invention can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way. In addition, a plurality of modes selected from the modes illustrated the specification may be used in combination.

D: Aspects Derivable from the Embodiment and the Modifications Described Above

The following configurations are derivable from at least one of the embodiment and the modifications described above.

D1: First Aspect

A management apparatus according to a first aspect includes a provider and a quality controller. The provider is configured to, in response to receiving a first request from a first node, provide the first node with first information corresponding to the first request, the first request being a request to control quality of communication within a group constituted by the first node and a plurality of second nodes, the first node and each of the plurality of second nodes each having a blockchain, the communication being communication for appending additional data to the blockchain, and the first node and the plurality of second nodes being configured to execute the communication. The quality controller configured to set quality of communication in a first communication path to quality that is better than or equal to a first quality in response to receiving the first information in addition to a second request from a receiving node among the plurality of second nodes, the receiving node having received the first information during forwarding of the first information within the group, and the second request being a request to control the quality of the communication in the first communication path. The first communication path includes a first end and a second end. The first end is the receiving node. The second end is a first connection node different from a node having forwarded the first information to the receiving node, the first connection node being a node among the nodes belonging to the group, and the first connection node being connected to the receiving node not via any of the nodes belonging to the group. According to this aspect, it is possible to set the quality of the communication in the first communication path to the quality that is better than or equal to the first quality. Thus, compared to a configuration in which communication in any of the communication paths between the plural nodes belonging to the group is not set to quality that is better than or equal to the first quality, it is possible to reduce latency in the timing of appending the additional data to the blockchain. Therefore, it is possible to assist a node to reduce the latency in the timing of appending the additional data to the blockchain.

D2: Second Aspect

In an example (second aspect) of the first aspect, the communication in the first communication path is communication executed by the receiving node and the first connection node. Communication, which is executed by the receiving node that constitutes one end of the first communication path and the first connection node that constitutes the other end of the first communication path, includes communication for appending the additional data to the blockchain. Accordingly, compared to a configuration in which communication in any of the communication paths between the plural nodes belonging to the group is not set to quality that is better than or equal to the first quality, it is possible to reduce latency in the timing of appending the additional data to the blockchain.

D3: Third Aspect

In an example (third aspect) of the first aspect or the second aspect, the quality controller is configured to further set quality of communication in a second communication path to quality that is better than or equal to the first quality in response to the first request being accompanied by a third request to control the quality of the communication in the second communication path. The second communication path includes a third end and a fourth end. The third end is the first node. The fourth end is a second connection node among the plurality of second nodes, the second connection node being connected to the first node not via any of the plurality of second nodes. According to this aspect, it is possible to set the quality of the communication in the second communication path to the quality that is better than or equal to the first quality. Thus, compared to a configuration in which communication in any of the communication paths between the plural nodes belonging to the group is not set to quality that is better than or equal to the first quality, it is possible to reduce latency in the timing of appending the additional data to the blockchain.

D4: Fourth Aspect

In an example (fourth aspect) of the third aspect, the communication in the second communication path is communication executed by the first node and the second connection node. Communication, which is executed by the first node that constitutes one end of the second communication path and the second connection node that constitutes the other end of the first communication path, includes communication for appending the additional data to the blockchain. Accordingly, compared to a configuration in which communication in any of the communication paths between the plural nodes belonging to the group is not set to quality that is better than or equal to the first quality, it is possible to reduce latency in the timing of appending the additional data to the blockchain.

D5: Fifth Aspect

In an example (fifth aspect) of any one of the first to the fourth aspects, the first node is configured to generate data to be included in a block to be connected to the blockchain. According to this aspect, it is possible to provide the provider with the first request in response to generating the data to be included in the block that is to be connected to the blockchain.

D6: Sixth Aspect

In an example (sixth aspect) of any one of the first to the fourth aspects, the first node is configured to generate a block to be connected to the blockchain. According to this aspect, it is possible to provide the provider with the first request in response to generating the block that is to be connected to the blockchain.

D7: Seventh Aspect

In an example (seventh aspect) of any one of the first to the sixth aspects, the quality controller is configured to receive node information from a forwarding source node of the first information among nodes in the group, the node information being indicative of a destination node of the first information. The quality controller is configured to determine, in response to a transmission source node of the second request and the first information corresponding to the node indicated by the node information, that the first information in addition to the second request is received from the receiving node. The quality controller is configured to determine, in response to the transmission source node of the second request and the first information not corresponding to the node indicated by the node information, that the second request is invalid. According to this aspect, it is possible to invalidate the second request from a node that has obtained the first information via an illegitimate route.

D8: Eighth Aspect

In an example (eighth aspect) of any one of the first to the seventh aspects, the additional data is transaction data, the transaction data being forwarded within the group. The first request is a request to control quality of communication related to the transaction data. The transaction data indicates one of the plurality of second nodes as a transaction node. The quality controller is configured to restore, in response to a notice indicative of receipt of a block including the transaction data by the transaction node, the quality of the communication to quality set previous to setting of the quality better than or equal to the first quality. According to this aspect, it is possible to substantially prevent quality of communication in the group from being at a high level for a duration longer than necessary.

D9: Ninth Aspect

In an example (ninth aspect) of the eighth aspect, the quality controller is configured to restore the quality of the communication to the quality set previous to setting of the quality better than or equal to the first quality in response to a first duration having elapsed since receipt of the notice. According to this aspect, it is possible to increase the probability of maintaining the quality of the communication in the group as the quality better than or equal to the first quality until a block arrives at all the nodes of the group.

DESCRIPTION OF REFERENCE SIGNS

1 . . . network system, 10 . . . management apparatus, 11 . . . communication device, 12 . . . storage device, 13 . . . processor, 131 . . . provider, 132 . . . quality controller, 20 . . . node, 21 . . . input device, 22 . . . output device, 23 . . . communication device, 24 . . . storage device, 25 . . . processor, 251 . . . operation controller, 252 . . . first requester, 253 . . . second requester, 254 . . . verifier, 255 . . . block generator, 30 . . . node, 40 . . . node, 50 . . . node, 60 . . . node, 71 to 74 . . . communication apparatus.

The invention claimed is:

1. A management apparatus comprising:
processing circuitry configured to
in response to receiving a first request from a first node, provide the first node with first information corresponding to the first request, the first request being a request to control quality of communication within a group constituted by the first node and a plurality of second nodes, the first information being a one-time pass being used to execute the control of the quality of the communication within the group, the first node and each of the plurality of second nodes each having a blockchain, the communication being communication for appending additional data to the blockchain, and the first node and the plurality of second nodes being configured to execute the communication; and set quality of communication in a first communication path to quality that is better than or equal to a first quality in response to receiving the first information in addition to a second request from a receiving node among the plurality of second nodes, the receiving node having received the first information during forwarding of the first information within the group, and the second request being a request to control the quality of the communication in the first communication path, wherein:
the first communication path includes a first end and a second end,
the first end is the receiving node, and
the second end is a first connection node different from a node having forwarded the first information to the receiving node, the first connection node being a node among the nodes belonging to the group, and the first connection node being connected to the receiving node not via any of the nodes belonging to the group.

2. The management apparatus according to claim 1, wherein the communication in the first communication path is communication executed by the receiving node and the first connection node.

3. The management apparatus according to claim 1, wherein:
the processing circuitry is configured to further set quality of communication in a second communication path to quality that is better than or equal to the first quality in response to the first request being accompanied by a third request to control the quality of the communication in the second communication path,
the second communication path includes a third end and a fourth end,
the third end is the first node, and
the fourth end is a second connection node among the plurality of second nodes, the second connection node being connected to the first node not via any of the plurality of second nodes.

4. The management apparatus according to claim 3, wherein the communication in the second communication path is communication executed by the first node and the second connection node.

5. The management apparatus according to claim 1, wherein the first node is configured to generate data to be included in a block to be connected to the blockchain.

6. The management apparatus according to claim 1, wherein the first node is configured to generate a block to be connected to the blockchain.

7. The management apparatus according to claim 1, wherein the processing circuitry is configured to:
receive node information from a forwarding source node of the first information among the nodes in the group, the node information being indicative of a destination node of the first information;
determine, in response to a transmission source node of the second request and the first information corresponding to the node indicated by the node information, that the first information in addition to the second request is received from the receiving node; and determine, in response to the transmission source node of the second request and the first information not corresponding to the node indicated by the node information, that the second request is invalid.

8. The management apparatus according to claim 1, wherein:

the additional data is transaction data, the transaction data being forwarded within the group, the first request is a request to control quality of communication related to the transaction data, the transaction data indicates one of the plurality of second nodes as a transaction node, and the processing circuitry is configured to restore, in response to a notice indicative of receipt of a block including the transaction data by the transaction node, the quality of the communication to quality set previous to setting of the quality better than or equal to the first quality.

9. The management apparatus according to claim 8, wherein the processing circuitry is configured to restore the quality of the communication to the quality set previous to setting of the quality better than or equal to the first quality in response to a first duration having elapsed since receipt of the notice.

10. The management apparatus according to claim 2, wherein:

the processing circuitry is configured to further set quality of communication in a second communication path to quality that is better than or equal to the first quality in response to the first request being accompanied by a third request to control the quality of the communication in the second communication path, the second communication path includes a third end and a fourth end, the third end is the first node, and the fourth end is a second connection node among the plurality of second nodes, the second connection node being connected to the first node not via any of the plurality of second nodes.

* * * * *